No. 650,437. Patented May 29, 1900.
W. W. VALENTINE.
AUTOMOBILE VEHICLE.
(Application filed May 1, 1899.)
(No Model.) 2 Sheets—Sheet 1.
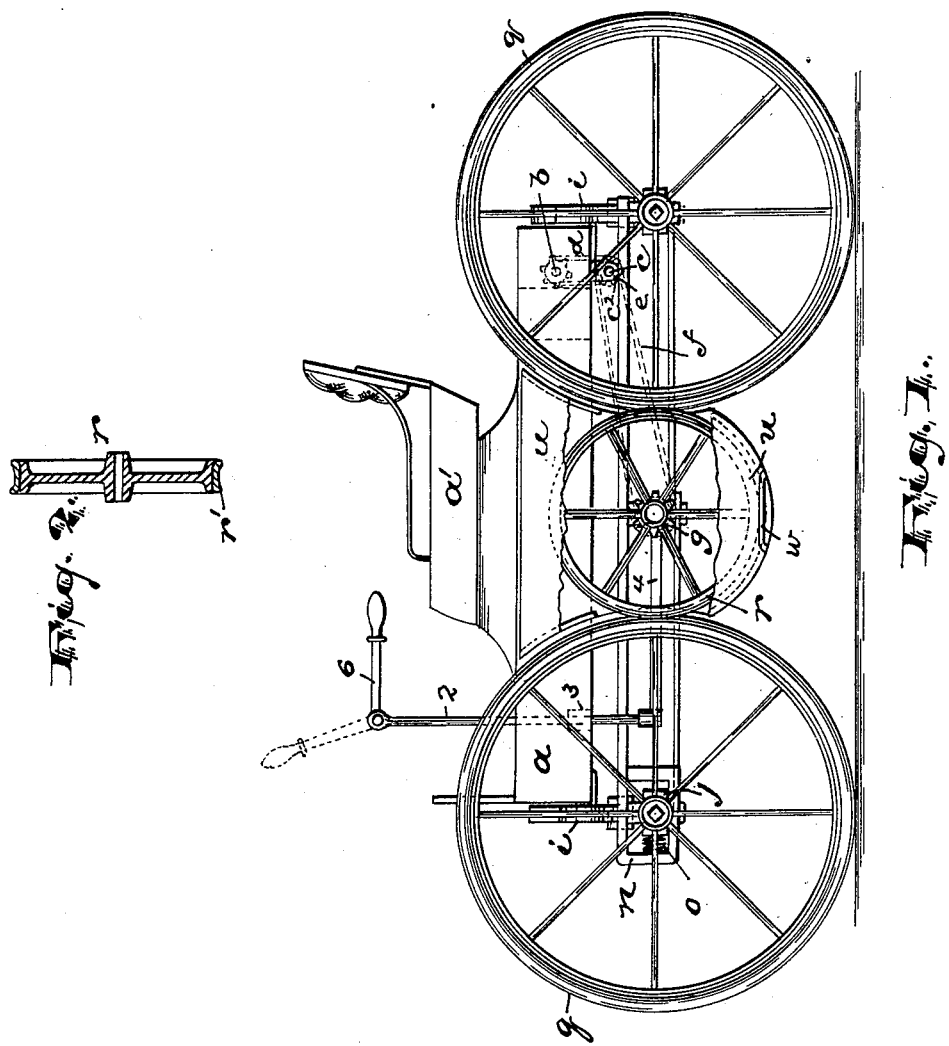
WITNESSES: INVENTOR No. 650,437. Patented May 29, 1900.
W. W. VALENTINE.
AUTOMOBILE VEHICLE.
(Application filed May 1, 1899.)
(No Model.) 2 Sheets—Sheet 2.
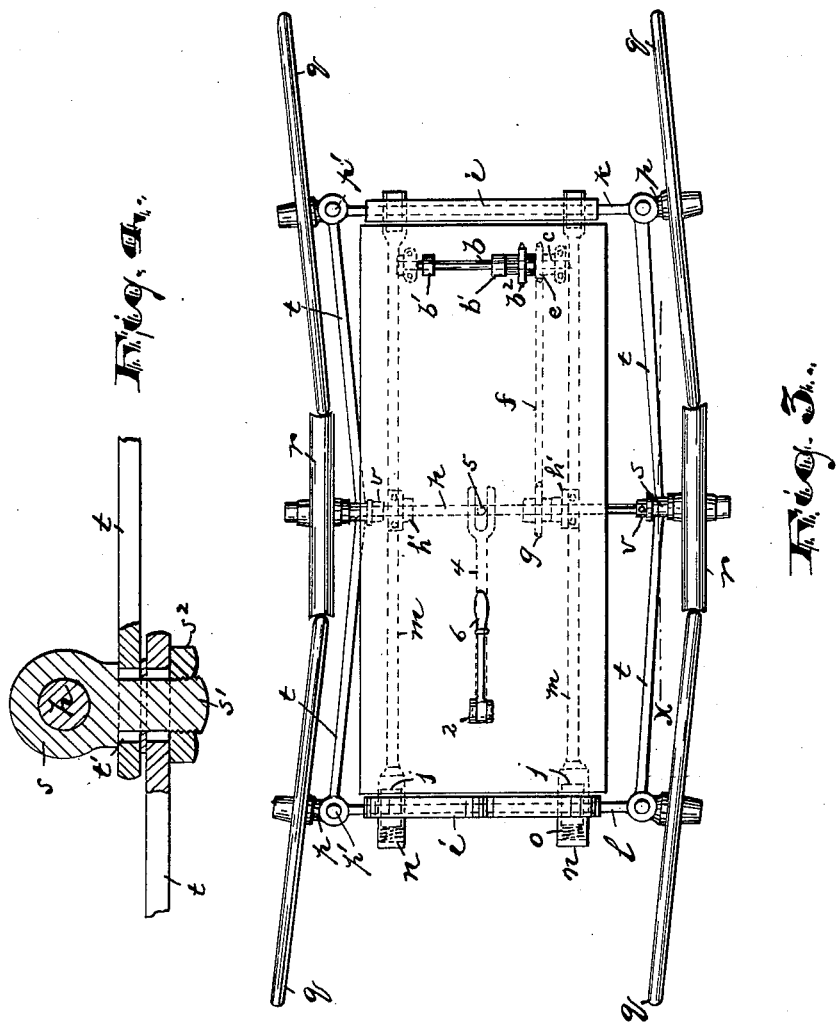
WITNESSES:
INVENTOR:
Waldo W. Valentine
BY
ATTORNEYS.

UNITED STATES PATENT OFFICE.

WALDO W. VALENTINE, OF WASHINGTON, DISTRICT OF COLUMBIA.

AUTOMOBILE VEHICLE.

SPECIFICATION forming part of Letters Patent No. 650,437, dated May 29, 1900.

Application filed May 1, 1899. Serial No. 715,086. (No model.)

*To all whom it may concern:*

Be it known that I, WALDO W. VALENTINE, a citizen of the United States, residing in the city of Washington, in the District of Columbia, have invented certain new and useful Improvements in Automobile Vehicles; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The objects of this invention are to provide a construction in which the power of the motor is economized in effecting a movement of the vehicle, to secure an increased driving contact with the ground by imparting power directly to all four wheels of the vehicle, whereby there is less opportunity for a wastage of motive force, to secure a more perfect and easily-operated method of steering the vehicle or deflecting it from a straight course, to secure a reduced range of movement required in the steering-lever governed by the hand of the driver, and to secure other advantages and results, some of which may be referred to hereinafter in connection with the description of the working parts.

The invention consists in the improved wheeled vehicle and in the arrangements and combinations of parts thereof, all substantially as will be hereinafter set forth and finally embraced in the clauses of the claim.

Referring to the accompanying drawings, in which like letters and numerals of reference indicate corresponding parts in each of the several views, Figure 1 is a side elevation of a vehicle embodying my improvements. Fig. 2 is a sectional detail of a certain driving-wheel. Fig. 3 is a plan of the vehicle with the body removed to show the working parts more clearly, and Fig. 4 is a detail sectional view on line $x$, Fig. 3.

In said drawings, $a$ indicates the body of a vehicle of my improved construction provided with a seat $a'$ in any usual manner. This body may also be the support or carrier for a motor by means of which the vehicle is driven in any suitable manner, the motor being of any ordinary style or type employing either gas or other hydrocarbon fluids, electricity, or any other suitable motive force, the said motor not being shown, it not being a material feature of my improvement.

$b$ indicates a driving-shaft rotated by said motor, said driving-shaft being preferably arranged in suitable bearings $b'$, attached to the body of the vehicle, and being provided with a sprocket wheel or wheels $b^2$, fast on said shaft.

$c^2$ indicates a sprocket-wheel arranged on a second or lower shaft $c$ and receiving its power from the first sprocket-wheel $b^2$ by means of a chain $d$ or other power-transmitting means, said lower shaft $c$ being provided with a second sprocket-wheel $e$, which may be of greater or less diameter than the first to increase or diminish the speed, as may be deemed desirable. From this lower shaft $c$ and its second sprocket $e$ power is transmitted through a chain $f$ to a sprocket-wheel $g$ upon a transverse shaft $h$, arranged beneath the vehicle-body about midway between the opposite ends of the vehicle in suitable bearings $h'$, the shaft being permitted to move longitudinally in said bearings a limited distance for the purpose of changing the direction of the vehicle, as will be hereinafter more fully described. To allow this longitudinal motion, the said sprocket-wheel $g$ and shaft $h$ are provided with a coöperating spline and groove (not shown) permitting a longitudinal independent movement of said parts, so that the shaft may be moved longitudinally without causing a corresponding movement of the sprocket-wheel, and thus undue strain upon the driving-chain $f$ is prevented in the steering operations hereinafter described. Obviously the transverse driving-shaft may receive power from the motor directly or without intervention of the shaft $c$, if desired.

The body $a$ of the vehicle is supported at each end upon springs $i$ in any usual manner, and the vehicle is provided with a frame $m$, made fast at its rearward end to the rear axle $k$. At its forward end said frame provides near each side of the vehicle slideways $n$ for boxes $j$, providing bearings for the forward axle $l$. Said boxes $j$ are adapted to slide backward and forward in the direction of the greatest length of the vehicle, carrying the forward axle with them, springs $o$ normally holding said boxes at a rearward position.

At the outer ends of the axles are independent sections $p$, hinged upon vertical pins $p'$, so as to freely bend backward and forward in a horizontal plane with respect to the main portion of the axle, and upon these hinged sections $p$ are secured the wheels $q$ of the vehicle in any usual manner.

The transverse sliding shaft $h$ preferably lies in the same horizontal plane with the axles of the vehicle, and said sliding shaft carries at each end a fixed driving-wheel $r$, disposed in the same plane with the vehicle-wheels $q$ and of such diameter as to engage said wheels at the periphery. Said driving-wheels $r$ in the preferred construction engage the running-wheels $q$ by frictional contact, as shown, to impart motion thereto; but I may under some conditions provide the rims of the running-wheels with radial perforations adapted to receive corresponding radially-projecting pins on the driving-wheels or any other suitable engagement of the peripheries may be provided without departing from the scope of my invention.

Each driving-wheel $r$ has a rim or tire preferably provided with a concave groove adapted to receive the convex tire of the wheels $q$, and thus the said wheels are not readily displaced from their relative positions of frictional contact with respect to the driving-wheel, as described. The driving-wheel may, however, have a flat rim or tire covered with rubber or the like to prevent slipping and being made broad, so that the running-wheels will not run off and a disconnection occur.

Near the opposite ends of the sliding shaft $h$ and adjacent to the driving-wheels $r$ are arranged collars $s$, said collars being loose on the shaft $h$ to allow said shaft to rotate therein. The collars are, however, held against longitudinal movement on said shaft by the hubs of the driving-wheels on the outside and stops $v$ on the inside made fast to the shaft by set-screws. The collars thus move positively with any longitudinal sliding of the shaft, as will be understood.

The collars $s$ have integral downwardly-projecting extensions $s'$, adapted to pass through the perforated ends of connecting-arms $t$ and threaded at the lower extremity to receive a nut $s^2$, by which said arms are held in place on the extensions $s'$. Said connecting-arms extend one forwardly and the other rearwardly from the sliding shaft $h$ and are rigidly bolted at their extremities to the hinged sections $p$ of the axles.

Instead of bolting I may, to secure greater rigidity, weld the ends of the connecting-arms $t$ to the hinged sections $p$ of the axles or form them of one integral piece therewith. This construction is preferred and is the one shown in the drawings. By this means as the sliding shaft $h$ is moved longitudinally the ends of the connecting-links, which are fastened thereto, are moved in the same direction an equal amount, the perforations $t'$ in the ends to receive the extensions $s'$ being elongated to permit such movement. This lateral movement of the ends of the four connecting-arms all in the same direction produces a turning of the four hinged sections $p$ upon their pins $p'$ and a corresponding turning of the wheels $q$ out of a position parallel to the vehicle-body. The opposite wheels of both front and rear pair retain their parallel position relative to one another; but the two wheels at one side of the vehicle have their adjacent edges carried inward toward the body, while the two on the opposite side have their adjacent parts carried outward in the same direction the sliding shaft $h$ is moved. The position of the wheels thus produced causes a curving of the course of the vehicle if moving to the opposite side from that toward which the sliding shaft was moved, and thus change of direction is more pronounced for a given range of movement of the sliding shaft $h$, because the rear wheels are turned as well as the front ones. Thus by my improved construction a turning of the direction of motion of the vehicle is readily effected by a longitudinal movement of the sliding shaft $h$ in the opposite direction. To effect such longitudinal movement of said shaft, I have shown a vertical post 2, adapted to turn in suitable bearings 3 at the forward part of the vehicle-body. The lower end of said post carries a forked arm 4, engaging a pin 5, projecting upward from the sliding shaft $h$, and to the top of the post is jointed a lever 6, extending into convenient position to be grasped by the hand of a person on the seat. Any other means of controlling lateral movement of the sliding shaft $h$ may, however, be used, if desired.

It will be obvious that as the shaft $h$ is slid toward either side and the two connecting-arms $t\ t$ on either side of the vehicle are displaced from a straight line the distance between the adjacent rims of the two wheels on either side of the vehicle is increased, and in order to preserve contact of the driving-wheel $r$ with said wheels it is necessary to have the springs $o$, before described, which serve to press the front axle backward toward the sliding shaft, whereby engagement of the front wheels with the driving-wheels is retained to effect a transmission of power while turning the vehicle. If necessary or desirable to also retain engagement between the driving-wheels and rear running-wheels while turning the vehicle, I may arrange the bearings $h'$ of the driving-shaft to slide longitudinally of the vehicle in boxes and slideways similar to those shown in connection with the front axle, or the rear axle may be so arranged.

A shield $u$, of any suitable kind, may inclose the driving-wheel $r$ to protect against inadvertent contact therewith, a step $w$ being attached to the lower end.

It will be evident that various changes and modifications may be made in the detail construction shown without departing from the spirit or scope of the invention, and I do not wish to be limited by the positive descriptive terms employed excepting as the state of the art may require.

Having thus described the invention, what I claim as new is—

1. In a vehicle, the combination with a body, of front and rear running-wheels normally in line with one another and adapted to be turned out of line to effect a turning of the vehicle, a driving-wheel arranged between a front and a rear running-wheel and in peripheral contact therewith, means for rotating said driving-wheel, and means for preserving peripheral contact of said driving-wheel and running-wheels when turned out of line, substantially as set forth.

2. In a vehicle, the combination of a body, front and rear axles having hinged end sections and wheels pivoted thereon, a transverse driving-shaft movable longitudinally, driving-wheels fixed on said shaft between the front and rear wheels and engaging at opposite parts said front and rear wheels to turn the same, and means for rotating said driving-shaft, substantially as set forth.

3. In an automobile vehicle, the combination of a body, front and rear axles having hinged end sections adapted to turn in a horizontal plane, supporting-wheels pivoted on said end sections, driving-wheels arranged upon a transverse sliding shaft between the front and rear supporting-wheels in peripheral engagement therewith, arms connecting said hinged sections and sliding shaft, means for moving said driving-shaft laterally and springs for forcing the front axle rearwardly, substantially as set forth.

4. In an automobile vehicle, the combination of a body, a rear axle, a front axle elastically supported and capable of moving toward or from said rear axle, wheels pivoted at the ends of said axles upon hinged end sections and having convex rims, driving-wheels arranged between the front and rear wheels and having concave rims receiving the convex rims of said front and rear wheels, means for rotating said driving-wheels to propel the vehicle and means for moving them laterally, substantially as set forth.

5. In an automobile vehicle, the combination of front and rear axles having end sections hinged to move in a horizontal plane and wheels pivoted thereon, a transverse sliding shaft having driving-wheels fast thereon, said driving-wheels lying between the front and rear wheels and transmitting motion thereto by peripheral engagement, connecting-arms fixed at one end to said end sections of the axles and at the other end joined to the transverse driving-shaft, means for rotating said driving-shaft and means for sliding it longitudinally, substantially as set forth.

6. The combination of the body a, front and rear axles held parallel but capable of being moved nearer together or farther apart, hinged end sections on said axles, running-wheels pivoted on said end sections, a transverse sliding driving-shaft and means for rotating the same, driving-wheels fixed on said shaft and engaging the running-wheels to transmit motion thereto, connecting-arms extending from said shaft to each hinged axle-section, a pin projecting upward from said shaft, and a post adapted to turn in bearings on the vehicle-body and having a lower forked arm engaging said pin and an upper operating-lever, whereby said sliding shaft is moved longitudinally, substantially as set forth.

7. In an automobile vehicle, the combination of front and rear axles fixed in parallel relation to each other and capable of moving toward or away from each other, hinged sections at the ends of said axles and running-wheels pivoted thereon, driving-wheels arranged between the front and rear wheels in engagement with the peripheries thereof, means for rotating said driving-wheels and means for moving them laterally in either direction, substantially as set forth.

8. In an automobile vehicle, the combination with the body, of a transverse driving-shaft movable longitudinally, driving-wheels fixed on said shaft and having concaved rims, an axle held parallel to said driving-shaft and free to move toward or away from said shaft, hinged sections at the ends of said axle, and wheels pivoted thereon, said wheels having convex rims engaging the driving-wheels frictionally, substantially as set forth.

9. In an automobile vehicle, the combination of a body, parallel front and rear axles, the front axle being movable toward and from the rear one, a transversely-sliding driving-shaft between said axles, hinged end sections on said axles and having integral arms connecting with said driving-shaft, and running-wheels and driving-wheels, substantially as set forth.

10. In an automobile vehicle, the combination with front and rear axles having hinged end sections and running-wheels pivoted thereon, of a transverse sliding shaft between said axles, collars on said shaft held against independent movement, connecting-arms extending from said hinged axle-sections to said collars, and driving-wheels fixed on the driving-shaft in peripheral frictional contact with the running-wheels, substantially as set forth.

11. In a vehicle, the combination with front and rear axles held in parallel relation and having hinged end sections and running-wheels pivoted thereon, the vehicle being guided by turning all the running-wheels by means of the hinged sections, of driving-wheels engaging the extreme peripheries of all the running-wheels to impart rotary motion thereto, and means for preserving engagement of driving-wheels and running-wheels when the vehicle is turned, substantially as set forth.

In testimony that I claim the foregoing I have hereunto set my hand this 21st day of February, 1899.

WALDO W. VALENTINE.

Witnesses:
CHARLES H. PELL,
C. B. PITNEY.